March 8, 1938.　　　　B. W. JONES　　　　2,110,707
CONTROL SYSTEM
Filed Oct. 8, 1936
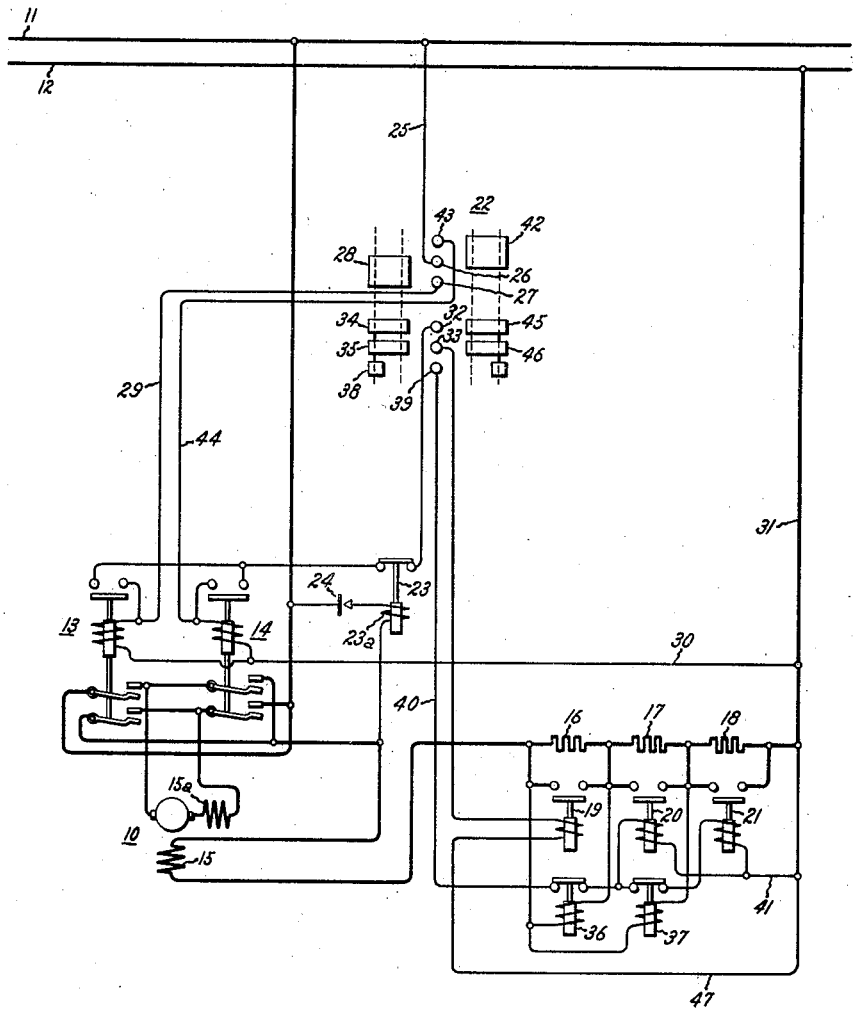
Inventor:
Benjamin W. Jones,
by Harry E. Dunlap
His Attorney.

Patented Mar. 8, 1938

2,110,707

UNITED STATES PATENT OFFICE 2,110,707

CONTROL SYSTEM

Benjamin W. Jones, Schenectady, N. Y., assignor to General Electric Company, a corporation of New York Application October 8, 1936, Serial No. 104,604

7 Claims. (Cl. 172—179)

This invention relates to control systems, more particularly to systems for controlling the starting, stopping and running of electric motors, and it has for an object the provision of a simple, reliable, inexpensive, and improved system of this character.

More specifically, the invention relates to systems for controlling the counter current braking of an electric motor. This operation is often referred to as "plugging" the motor. The terms "counter current braking" and "plugging" have the same meaning throughout the specification and claims. A motor is plugged when the armature is rotating in one direction and voltage is applied which tends to cause the motor armature to rotate in the opposite direction. A direct current motor may be plugged by reversing the voltage on either the field or on the armature. When a motor is plugged, a powerful braking torque is exerted and for this reason plugging is frequently used for rapidly decelerating a motor and its load.

Normally the counter voltage of a motor opposes the line voltage, and therefore, limits the motor current to a relatively low value. However, when the motor is plugged, its counter voltage is reversed, and becomes additive to the line voltage. If the motor is plugged when operating at full speed, the resultant voltage, i. e., the sum of the line and counter voltage, tends to cause an abnormal current to flow which is many times the normal full load current. Means must be provided for limiting this current to a safe value. The resistor used for starting and accelerating the motor from rest can be reinserted at the instant of plugging to assist in limiting the current and torque to safe values. However, the amount of resistance required for starting and accelerating is usually much less than the amount required to limit the plugging current to a safe value when the motor is plugged while rotating at a relatively high speed. For that reason an additional section of resistance, usually referred to as the plugging section, is connected in series with the starting resistance, and the total resistance is inserted when the motor is plugged. Since the plugging section of resistance is in addition to the resistance utilized for starting and accelerating, it is desirable to control this section in such a manner that it will be short circuited immediately when the motor is started from rest, but will be included in the motor circuit when the motor is plugged, until the motor has decelerated to a predetermined low speed.

The plugging section of the resistance is usually controlled by a contactor known as the plugging contactor, and this contactor in turn is usually controlled by electroresponsive devices known as plugging relays. Since the plugging section of the resistances is to be short circuited at a predetermined low speed of the motor during plugging, and since the counter voltage of the motor is a function of its speed, it is desirable to connect the plugging relay across the armature of the motor to be responsive to the counter voltage. Such a connection, however, introduces new difficulties, because if the plugging relay is energized by the counter voltage to maintain the plugging section short circuited when starting and during normal running, it will also respond to the counter voltage and short circuit the plugging sections when the motor is plugged while running at a fairly good speed, and thus the desired protection is not obtained. Accordingly, a further object of this invention is the provision of a plugging control in which the plugging relay is actuated by the counter voltage of the motor and in which the plugging relay causes the plugging section to be inserted when the motor is plugged and also causes the plugging section to be short circuited when the motor is started from rest and during normal running.

In carrying the invention into effect in one form thereof, an electric motor is connected to a supply source through a current limiting device and an electroresponsive device, connected to be responsive to the counter voltage of the motor, is provided for controlling the current limiting device. Means are provided for establishing counter current braking connections for the motor, and in addition means are provided for preventing the electroresponsive device from responding to the motor counter voltage to insert the current limiting device in the motor circuit during starting and during normal running and for causing the electroresponsive device to respond and insert the current limiting device when the motor is plugged while operating at a speed above a predetermined value.

For a better and more complete understanding of the invention reference should now be had to the following specification and to the accompanying drawing, the single figure of which is a simple, diagrammatical representation of an embodiment of the invention.

Referring now to the drawing, an electric motor 10 is supplied from a suitable source illustrated in the drawing by the two supply lines 11 and 12 to which the motor may be connected by suitable means, such as the electromagnetic contactors 13 and 14. Although the motor 10 may be of any suitable type, it is shown for the purposes of illustration as a series type direct current motor provided with a series field winding 15 and with a series commutating winding 15a. When the contactor 13 is operated to its closed position, it connects the motor to the supply source for operation in the forward direction, and when the contactor 14 is closed, the motor is connected to the source for rotation in the reverse direction.

For the purpose of limiting the motor current to safe values, suitable current limiting means are provided. These means are illustrated as comprising a resistance having a section 16 connected in the motor circuit for limiting the motor current during the plugging operation and additional portions 17 and 18 connected in the motor circuit between the plugging section and one side of the line for limiting the motor current during starting and acceleration of the motor. The inclusion of these resistance sections in the motor circuit and the short circuiting of these resistance sections are effected by suitable means such as electromagnetic contactors 19, 20, and 21 for controlling the resistance sections 16, 17, and 18 respectively. The contactor 19 which controls the plugging section of the resistance is usually referred to as the plugging contactor, whilst the contactors 20 and 21 which control the accelerating sections 17 and 18 of the resistance are known as accelerating contactors. As shown in the drawing, the plugging contactor 19 is jointly under the control of a reversing multi-position master switching device 22 and an electroresponsive device 23 referred to as a plugging relay. It will be noted that one terminal of the winding 23a of the plugging relay is connected to a point between the side 11 of the source and the main contacts of the reversing contactors 13, 14, whereas the opposite terminal of the winding 23a is connected to a point between the opposite side of the supply source and the main contacts of the reversing contactors 13, 14. In other words, the operating coil of the plugging relay is connected outside the main contacts of the reversing contactors so that it is connected across the armature terminals of the motor 10 only so as to be responsive to the counter voltage of the motor 10 when one or the other of the reversing contactors is closed.

The plugging relay 23 is so designed and constructed that it will attract its armature when connected across a voltage drop of a predetermined critical value. When the voltage drop is less than this value, the armature of the relay is unattracted. As shown, the plugging relay 23 is a normally closed relay, i. e., its contacts are closed when its coil is deenergized. The contacts of plugging relay 23 are connected in the energizing circuit of the operating coil of the plugging contactor 19. The energizing circuit of the plugging contactor also passes through the master switch 22 and through the normally open interlock contacts of the reversing contactors 13 and 14. In order to close the plugging contactor 19 to short circuit the plugging section 16 of the resistance, it is necessary for the master switch 22 to be operated to one of its running positions, for one or the other of the reversing contactors 13, 14 to be actuated to its closed position, and for the plugging relay to be deenergized and its contacts in the closed position in which they are illustrated. However, when one or the other of the reversing contactors 13 or 14 is closed, the operating coil 23a of the plugging relay is connected across the terminals of the motor armature. In order to prevent the plugging relay 23 from responding to a counter voltage of the motor in excess of the value necessary to cause the relay 23 to open its contacts and thereby to deenergize the plugging contactor 19 and insert the plugging section of the resistance 16 in the motor circuit during starting or normal running, means are provided for preventing the relay 23 from responding to the counter voltage of the motor during starting and normal running operation. These means are illustrated as a rectifying device 24 connected in the energizing circuit of the relay 23. Although any suitable type of rectifying device may be used, preferably an inexpensive plate surface contact type rectifying device, such for example as a copper oxide rectifying device conventionally illustrated in the drawing, is employed. It will be understood however, that any other suitable form of rectifying device may be utilized if desired.

With the foregoing understanding of the elements and their organization in the system, the operation of the system itself will readily be understood from the following description:

With the system in the normally deenergized condition, in which it is illustrated in the drawing, the motor 10 is started in the forward direction by operating the master switch 22 to its first operating position for the forward direction of rotation. In this position of the master switch, an energizing circuit is established for the operating coil of the forward contactor 13. This circuit is traced from the positive supply line 11 through conductor 25, fingers 26 and 27 of the master switch, bridged by segment 28, conductor 29, operating coil of contactor 13 and thence by conductors 30 and 31 to the lower side 12 of the supply source. Simultaneously, the fingers 32 and 33 of the master switch are bridged by the segments 34 and 35 and thus an energizing circuit for the plugging contactor 19 is partially completed through fingers 32 and 33 and through the normally closed contacts of the plugging relay 23. Forward contactor 13 closes in response to energization and connects the armature of the motor 10 to the source 11 for rotation in the forward direction. In the closed position of the forward contactor 13, its upper auxiliary interlock contacts complete the energizing circuit for the operating coil of the plugging contactor 19 which thereupon closes its contacts and short circuits the plugging section 16 of the resistance. This sequence of operation takes place so rapidly that the operation of the master switch 22 to a running position and the short circuiting of the plugging sections 16 take place practically simultaneously.

At the instant of the closing of the main contacts of the forward contactor 13, a voltage drop appears across the resistance sections 16, 17, and 18. The voltage drop across the plugging section of the resistance 16 is sufficient to energize the accelerating relay 36 and similarly the voltage drop across the sections 16 and 17 is sufficient to energize the accelerating relay 37. As a result, both of these relays respond to the voltage drop across the resistance sections and open their contacts.

The short-circuiting of the resistance section 16 allows sufficient current to flow in the armature circuit of the motor to cause it to accelerate. As it accelerates, its counter voltage builds up and if it were not for the rectifying device 24 in the energizing circuit of the plugging relay 23, the latter would respond at a predetermined value of the counter voltage and open its contacts to deenergize the plugging contactor 19 and reinsert the plugging section 16 in the motor circuit. However, the rectifying device 24 is so connected that it allows no current to flow through the operating coil of the relay 23 when the motor is starting from rest and consequently the plugging section 16 is maintained short-circuited during starting of the motor.

Operation of the master switch 22 to its second forward position partially completes the energizing circuit for the operating coil of the accelerating contactor 20. This energizing circuit is the same as that previously traced for the operating coil of the plugging contactor 19 from the side 11 of the supply source to the finger 32 and from this point the energizing circuit is traced through the segments 34, 35, and 38, finger 39, conductor 40 to the open contacts of the accelerating relay 36. The relay 36 was maintained open in response to the voltage drop across the plugging section 16. However, short-circuiting of this section of the resistance by the plugging contactor 19 caused this voltage drop to disappear and after an interval of time determined by the constant of the relay 36, the latter closes its contacts to complete an energizing circuit for the accelerating contactor 20 through its operating coil and the conductors 41 and 31 to the lower side 12 of the supply source. Contactor 20 in responding to energization closes its contacts to short circuit the accelerating section 17 of the resistance and thereby to increase the speed of the motor 10.

The short-circuiting of section 17 of the resistance causes the voltage drop across this section to disappear and after an interval of time determined by the constants of the relay 37, the latter closes its contacts to complete an energizing circuit for the accelerating contactor 21 through its operating coil and the conductor 41 to the lower side of the supply source 12. The contactor 21 closes its contacts in response to energization and short-circuits the final accelerating section 18 of the resistance and thus completes the acceleration of the motor 10 which now rotates at full running speed.

Although the operation of the master switch 22 from its off position to its full running speed position is described as taking place in definite steps, it will be understood that the operator usually carries out this operation by throwing the master switch quickly and in one motion from the off position to the full running position.

Now assuming that the motor is operating at full speed and that it is desired to plug the motor quickly to rest, this operation is accomplished by operating the master switch 22 in the reverse direction. The operator usually accomplishes this operation in a single complete movement, quickly throwing the master switch from the full speed forward position to the full speed reverse position. As the master switch is moved from the second forward position to the first forward position, the energizing circuits of the accelerating contactors 20 and 21 are interrupted and these contactors open their contacts to insert resistance sections 17 and 18 in the motor circuit. Similarly, as the master switch is moved from its first forward position to its off position, the energizing circuit for the plugging contactor 19 is interrupted, as a result of which this contactor opens its contacts and inserts the plugging section 16 of the resistance in the motor circuit. In like manner, as the master switch 22 is moved to its central or off position, the energizing circuit for the forward contactor is interrupted and this contactor opens its main contacts disconnecting the motor from the supply source and also opens its auxiliary interlock contacts further to interrupt the energizing circuit for the plugging contactor 19.

In the first reverse position of the master switch 22, an energizing circuit is completed for the operating coil of the reverse contactor 14. This energizing circuit is readily traced from the finger 26 through segment 42 and finger 43, conductor 44, operating coil of reverse contactor 14 and thence through conductors 30 and 31 to the lower side of the supply source. The contactor 14 closes in response to energization and connects the motor 10 to the line for rotation in the reverse direction. It is important to note that contactor 14 in closing reverses the connections of the operating coil $23_a$ of the plugging relay 23 to the armature terminals of the motor 10. Since at this point in the operation, the rotation of the armature is still in the same direction and the current in the main field winding 15 is still in the same direction, the counter voltage of the motor is in the same direction as before. However, since the connections of the energizing circuit of the plugging relay 23 are now reversed with respect to the armature terminals of the motor 10, the rectifying device 24 allows current to flow through the operating coil $23_a$ of the plugging relay 23. If the motor 10 was running at high speed when plugged, as described in the foregoing, the counter voltage of the motor will be sufficient to energize the relay 23 and to cause it to open its contacts. This interrupts the energizing circuit for the plugging contactor 19 and consequently, the plugging contactor remains open and the plugging section 16 of the resistance is inserted in the armature circuit and is effective to limit the armature current to a safe value. Similarly, since the energizing circuit of the accelerating contactors 20 and 21 pass through the contacts of the plugging relay 23, these contactors remain open and the accelerating sections 17 and 18 are also inserted in the armature circuit to assist the plugging section 16 in limiting the armature current to a safe value.

It will be understood that when the motor is running at full speed and its armature is suddenly connected to the line for rotation in the reverse direction, its counter voltage, which previously opposed the line voltage, now adds to the line voltage and consequently substantially 200% voltage is applied across the resistance in the armature circuit. Obviously, if the plugging section 16 of the resistance were short circuited at this time, the current would rise to a dangerously high value. Even with the plugging section 16 of the resistance in circuit, the current rises to a substantial value and produces a large braking torque, as a result of which the speed of the motor is rapidly decreased. As the speed and counter voltage of the motor are decreased, the energization of the plugging relay 23 decreases in proportion. At a predetermined low value of counter voltage and therefore at a predetermined low speed of the motor 10, the energization of the relay 23 is decreased sufficiently to allow the relay to close its contacts and to complete an energizing circuit for the plugging contactor 19. This circuit is traced from the upper side 11 of the supply source through the fingers 26 and 43 bridged by the segment 42 of the master switch, conductor 44, upper interlock contacts of reverse contactor 14, normally closed contacts of plugging relay 23, fingers 32 and 33 bridged by segments 45 and 46, operating coil of plugging contactor 19 and thence through conductors 47 and 31 to the lower side 12 of the supply source. Plugging contactor 19 now closes and short circuits the plugging section 16 of the resistance, substantially at the instant that the speed of the armature of the motor 10 becomes zero.

Since the armature of the motor 10 is connected through the reverse contactor 14 to the source, it immediately begins to rotate in the reverse direction. As the direction of rotation of the armature reverses, the polarity of its counter voltage also reverses and the rectifying device 24 in the energizing circuit of the plugging relay 23 again prevents current from flowing in the energizing circuit. Consequently as the motor 10 comes up to speed in the reverse direction, the energizing circuit for the plugging contactor is maintained closed and the plugging section 16 of the resistance is short-circuited. From this point, the acceleration of the motor in the reverse direction is substantially identical with the acceleration in the forward direction described in the foregoing.

Thus, it will be noted that when the motor is plugged while running at a fair speed, the rectifier 24 allows current to flow in the energizing circuit of the plugging relay 23 and causes the latter to open its normally closed contacts and interrupt the energizing circuit of the plugging contactor 19, so that this contactor opens and inserts the plugging section 16 in the armature circuit of the motor and thus provides the required protection during plugging. It will also be noted that when starting from rest and during normal running operation, the rectifier 24 prevents current from flowing in the operating winding of the plugging relay 23 so that the normally closed contacts of this relay complete an energizing circuit for the plugging contactor 19 and thereby causes this contactor to short circuit the plugging section 16 of the resistance at a time when it is not needed.

A further advantage of the system as described is that when starting from rest the plugging contactor 19 is energized substantially simultaneously with the closing of one or the other of reversing contactors 13, 14 because the contacts of the plugging relay 23 are normally closed. If it were necessary to wait for the plugging relay to close its contacts to complete the energizing circuit for the plugging contactor 19, additional time would be lost. In an application in which the motor may be reversed thousands of times in a day, this additional time lost with each starting of the motor would add up to a very substantial amount when aggregated over a period of months or years. It will thus be seen that the described arrangement decreases the lost time and therefore increases the efficiency of the motor and the apparatus driven thereby.

Although in accordance with the provisions of the patent statutes, this invention is described as embodied in concrete form, it will be understood that the elements and connections shown and described are merely illustrative and that the invention is not limited thereto since alterations and modifications will readily suggest themselves to persons skilled in the art without departing from the spirit of this invention or from the scope of the annexed claims.

What I claim as new and desire to secure by Letters Patent of the United States, is,—

1. A control system comprising in combination an electric motor, a current limiting device in circuit therewith, an electroresponsive device connected to the armature terminals of said motor so as to be responsive substantially solely to the counter voltage of said motor for controlling said current limiting device, means for establishing counter current braking connections for said motor and means for preventing said electroresponsive device from responding to said counter voltage during normal running operation of said motor, and providing for actuation of said electroresponsive device to render said current limiting device active upon establishment of said braking connections.

2. A control system comprising in combination an electric motor, a current limiting device in circuit with said motor, a relay having an energizing circuit connected to the armature terminals of said motor so as to be responsive only to the counter voltage of said motor for controlling said current limiting device, a rectifier connected in said energizing circuit for maintaining said relay inactive during normal running operation of said motor, and switching means for establishing counter current braking connections for said motor and for reversing the connections of said energizing circuit with respect to the counter voltage of said motor whereby said rectifier passes current and causes said relay to respond and render said current limiting device active.

3. A control system comprising in combination, an electric motor, a current limiting resistance in the armature circuit thereof, a relay for controlling said resistance, said relay having an operating winding connected to the armature terminals of said motor so as to be responsive only to the counter voltage of said motor, a rectifier connected in said circuit for maintaining said relay deenergized during normal running operation of said motor thereby to short circuit said resistance, and switching mechanism for establishing counter current braking connections for said motor and for simultaneously reversing the connections of said rectifier with respect to the voltage of said motor, thereby to provide for energization of said relay and short-circuiting said resistance.

4. A control system comprising in combination an electric motor, a current limiting resistor in circuit therewith, a contactor for controlling said resistor, said contactor having an energizing circuit, a relay having an energizing circuit connected to be responsive to the counter voltage of said motor and having normally closed contacts in the energizing circuit of said contactor, and a rectifying device connected in the energizing circuit of said relay to prevent energization of said relay and thereby to effect energization of said contactor to short circuit said resistor during normal operation of said motor, and for effecting energization of said relay and deenergization of said contactor thereby to remove the short circuit about said resistor in response to establishment of counter current braking connections for said motor.

5. A control system comprising in combination an electric motor, a current limiting resistor in circuit therewith, a contactor for controlling said resistor, said contactor having an energizing circuit, a relay having normally closed contacts for partially completing said energizing circuit, said relay having an energizing circuit connected to be responsive to the counter voltage of said motor, reversing switching mechanism for energizing said motor for operation in a selected direction and for completing said contactor energizing circuit thereby to effect short circuiting of said resistor, a rectifying device connected in said relay energizing circuit for preventing energization of said relay and interruption of said short circuit when starting said motor from rest and during normal running operation and providing for energization of said relay thereby to interrupt said short circuit and render said current limiting resistor effective upon establishment of counter current braking connections for said motor.

6. A control system comprising an electric motor, a current limiting resistor in circuit therewith, a contactor for controlling said resistor, said contactor having an energizing circuit, a relay having normally closed contacts in said energizing circuit, an energizing circuit for said relay, reversing switching mechanism for said motor and for connecting said relay energizing circuit to said motor and completing said contactor energizing circuit to effect short circuiting of said resistor, and a rectifying device in said relay energizing circuit for preventing energization of said relay and interruption of said short circuit during starting and normal running and providing for energization of said relay and interruption of said short circuit upon operation of said reversing switching mechanism to establish counter current braking connections for said motor.

7. A control system comprising in combination, an electric motor, a current limiting resistor in circuit therewith, a contactor for controlling said resistor, said contactor having an energizing circuit, a relay having normally closed contacts in said energization circuit, an energizing circuit for said relay, reversing switching mechanism for said motor and for connecting said relay energizing circuit to said motor, a reversing master switch for controlling said reversing switching mechanism, said master switch being provided with contacts for completing said contactor energizing circuit upon operation of said master switch from its off position to a running position, to effect short circuiting of said resistance, and a rectifier in said relay energizing circuit for preventing operation of said relay to render said resistor effective during starting and normal running of said motor and providing for energizing said relay to render said resistor effective upon operation of said master switch to establish counter current braking connections for said motor.

BENJAMIN W. JONES.